(12) United States Patent
Krishnamoorthy

(10) Patent No.: US 9,076,034 B2
(45) Date of Patent: Jul. 7, 2015

(54) OBJECT LOCALIZATION USING VERTICAL SYMMETRY

(71) Applicant: ANALOG DEVICES, INC., Norwood, MA (US)

(72) Inventor: Venkatesan Krishnamoorthy, Mayiladuthurai (IN)

(73) Assignee: ANALOG DEVICES, INC., Norwood, MA (US)

( * ) Notice: Subject to any disclaimer, the term of this patent is extended or adjusted under 35 U.S.C. 154(b) by 238 days.

(21) Appl. No.: 13/755,916

(22) Filed: Jan. 31, 2013

(65) Prior Publication Data

US 2014/0161308 A1 Jun. 12, 2014

Related U.S. Application Data

(60) Provisional application No. 61/734,572, filed on Dec. 7, 2012.

(51) Int. Cl.
*G06K 9/00* (2006.01)
*G06K 9/46* (2006.01)
*G06T 7/60* (2006.01)

(52) U.S. Cl.
CPC ........ *G06K 9/00369* (2013.01); *G06K 9/00805* (2013.01); *G06K 9/4642* (2013.01); *G06T 7/608* (2013.01); *G06T 2207/20021* (2013.01); *G06T 2207/30196* (2013.01)

(58) Field of Classification Search
CPC .......... G06K 9/00369; G06K 9/00805; G06K 9/4642; G06K 2207/20021; G06T 2207/30196; G06T 7/608
See application file for complete search history.

(56) References Cited

U.S. PATENT DOCUMENTS

| | | | |
|---|---|---|---|
| 7,630,806 B2 * | 12/2009 | Breed | 701/45 |
| 2005/0084156 A1 * | 4/2005 | Das et al. | 382/224 |
| 2008/0212850 A1 * | 9/2008 | Adachi et al. | 382/118 |

\* cited by examiner

*Primary Examiner* — Tom Y Lu

(57) ABSTRACT

A symmetric object in an image is identified by (a) converting an edge map of the acquired image into a binary image map including binary pixel values; (b) dividing the binary image map within a scanning window into multiple bins; (c) summing binary pixel values in each bin; and (d) identifying the symmetric object based at least in part on the summed binary pixel values in the bins.

29 Claims, 8 Drawing Sheets

| APPROACH | PASSING CRITERIA | DETECTION RATE | FALSE DETECTION RATE |
|---|---|---|---|
| NORMAL APPROACH | THE WHOLE WINDOW PASSES THE VERTICAL SYMMETRY CHECK | 99% | 56% |
| THREE HORIZONTAL STRIPS | MIDDLE STRIP PASSES THE VERTICAL SYMMETRY CHECK | 90% | 40% |
| THREE HORIZONTAL STRIPS | TOP STRIP PASSES THE VERTICAL SYMMETRY CHECK | 83% | 35% |
| THREE HORIZONTAL STRIPS | BOTTOM STRIP PASSES THE VERTICAL SYMMETRY CHECK | 90% | 40% |
| THREE HORIZONTAL STRIPS | ANY TWO STRIPS PASS THE VERTICAL SYMMETRY CHECK | 95% | 41% |
| THREE HORIZONTAL STRIPS | ANY ONE OF THREE STRIP PASSES THE CHECK | 99% | 55% |
| THREE HORIZONTAL STRIPS | ALL THE THREE STRIPS PASSES THE CHECK | 69% | 18% |

FIG. 5C

OBJECT LOCALIZATION USING VERTICAL SYMMETRY

CROSS-REFERENCE TO RELATED APPLICATION

This application claims priority to, and the benefits of, U.S. Provisional Application Ser. No. 61/734,572, filed on Dec. 7, 2012, the entire disclosure of which is hereby incorporated by reference.

FIELD OF THE INVENTION

The present invention relates, in general, to image processing and, more specifically, to locating objects in camera-recorded digital images.

BACKGROUND

Intelligent transportation systems, such as collision-avoidance systems, provide various levels of warning to automobile drivers to increase their safety and/or to reduce vehicular accidents. Various techniques have been developed to gather information about a vehicle's path of motion, other vehicles' locations, and/or the surrounding environment. For example, vision-based pedestrian-detection systems determine pedestrian locations in order to inform drivers of the distance between the vehicle and the pedestrians or the speed reduction required to avoid hitting the pedestrians. In fact, due to widespread pedestrian injury in relatively dense population environments (e.g., urban area), systems capable of detecting and alerting the driver to the presence of pedestrians in the path of the vehicle have been incorporated in collision-avoidance systems. In a typical pedestrian-detection system, a camera on the front of a vehicle captures images of the surrounding environment and image-processing software identifies pedestrians in the images.

Various approaches have been used to detect pedestrians in an acquired image. For example, one approach identifies pedestrians by detecting, over a series of images, the periodic motion characteristic of a person walking or running; because multiple images must be analyzed, the process is slow. Another approach recognizes pedestrians utilizing integration of texture information (e.g., image structures), template matching, and "inverse perspective mapping" (IPM). These approaches may provide robustness in identifying and tracking pedestrians, but depend on a template for the human walking model for template matching based, for example, on the Hausdorff distance (which measures how far two subsets of a metric space are from each other). To detect pedestrians having different walking styles, more than one walking model may be necessary. "Shape-based" systems attempt to identify a human shape among various object shapes in an image. The shape-based approach typically includes a classifier that can be trained to recognize a human shape among various other shapes in a set of training images. This training process may be time consuming and/or difficult, particularly if the image quality is poor (e.g., due to low contrast). So-called "neural nets" have also been proposed to detect and locate pedestrians. Although any of these approaches may be used with some degree of success, they generally involve intensive computation and thus require excessive processing systems to operate effectively. This may result in significant delays in real-time pedestrian detection and lead to safety hazards.

Consequently, there is a need for a fast approach to pedestrian detection that can be employed onboard a vehicle using a low-cost processing system.

SUMMARY

In various embodiments, the present invention relates to systems and methods for coarsely but quickly detecting pedestrians in an image based at least in part on vertical symmetry. The approaches described herein provide real-time pedestrian information without the need for expensive system requirements. In various embodiments, the acquired image is first converted to an edge map using a conventional approach; the converted edge map is then converted into a binary image map having binary pixel values. A scanning window, determined based on the complexity of the binary image map, is moved over the binary image map. At each location, the binary image map within the scanning window is divided into multiple horizontal or vertical bins, and the binary pixel values in each bin are summed. The locations of pedestrians can then be identified based on the summed binary pixel values in the bins. In one embodiment, two horizontal or vertical bins equidistant from the center of the scanning window are paired together; if the summed binary pixel value in each bin of a given pair is above a predetermined threshold, there is a likelihood of having a pedestrian's image located in this pair of bins. A larger number of bin pairs having summed binary pixel values above the threshold indicates a higher likelihood of detecting a pedestrian in the scanning window.

In another embodiment, the binary pixel values of bins in a pair are further summed together. If the summed value of a pair is larger than a second predetermined threshold, it indicates a likelihood of pedestrian presence. Again, a larger number of paired bins having summed binary pixel values above a second threshold indicates a higher likelihood of pedestrian presence in the scanning window. Because embodiments of the invention utilize simple calculation, e.g., summation, over a small number of bins in a scanning window, real-time information regarding pedestrian locations can be obtained quickly and with minimal computational complexity. Additionally, this approach may be used as a first pass when integrated with other pedestrian-detection approaches to reduce the number of detection points for the other approach(es) to process, thereby quickly obtaining more detailed and accurate pedestrian locations.

Accordingly, in one aspect, the invention pertains to a method for identifying a symmetric object in an image represented as an edge map. The method includes: (a) converting the edge map into a binary image map having binary pixel values; (b) dividing the binary image map within a scanning window into multiple bins; (c) summing binary pixel values in each bin; and (d) identifying the symmetric object based at least in part on the summed binary pixel values in the bins. In various embodiments, the scanning window is moved to a different location within the binary image map; steps (c), (d) and (e) are repeated in each location. Dimensions of the scanning window may be determined based on a size of the object.

In one implementation, converting the edge map into a binary image map includes comparing each pixel value in the edge map with a threshold value that is predetermined based at least in part on pixel values in the edge map. In some embodiments, identifying the symmetric object includes comparing the summed binary pixel values with a second threshold value. The second threshold value may be predetermined or dynamically calculated based on the image. For example, the second threshold value satisfies an equation: $TH_1=Max(TH_a,TH_b)$, where $TH_a$ is a function of a number of pixels having values above a second threshold; $TH_b$ represents a percentage of a number of pixels in each bin; and Max is a function that returns a larger value of $TH_a$ and $TH_b$.

The method may include comparing the summed binary pixel values of two horizontal or vertical bins having locations that are symmetric in the scanning window. In one embodiment, the method further includes summing the summed binary pixel values of two horizontal or vertical bins having locations that are symmetric in the scanning window. The symmetric object is identified by comparing the summed binary pixel values of the two bins with a third threshold value. The multiple bins may be overlapping or non-overlapping. In one embodiment, the multiple bins contain an identical number of binary pixels. The numbers of the horizontal and vertical bins may satisfy equations:

$$B_h = \frac{M}{m}, B_v = \frac{N}{n},$$

where $B_h$ and $B_v$ denote the number of horizontal and vertical bins, respectively, within the scanning window; N and M are horizontal and vertical numbers of binary pixels, respectively, of the scanning window; and n and m are the horizontal and vertical numbers of binary pixels, respectively, in each bin. In various embodiments, each bin is further divided into multiple sub-bins; the symmetric object is determined based at least in part on the summed binary pixel values in the sub-bins.

In a second aspect, the invention relates to a system of identifying a symmetrical object in an image. The system includes computer memory for storing an edge map of the image and a computer processor configured to (a) convert the edge map into a binary image map including binary pixel values; (b) divide the binary image map within a scanning window into multiple bins; (c) sum binary pixel values in each bin; and (d) identify the symmetrical object based at least in part on the summed binary pixel value in the bins. In various embodiments, the binary image map is stored in the computer memory. The processor (e.g., a digital-signal processor) may be further configured to compute a sum of the summed binary pixel values of two horizontal or vertical bins having locations that are symmetric in the scanning window.

As used herein, the term "pedestrian" refers broadly to a human or any object that is symmetric in any direction (e.g., vehicles); the terms "substantially" means ±10% (e.g., by distance or by angle), and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the following description, various embodiments of the present invention are described with reference to the following drawings, in which:

FIG. 3B is a binary image map converted from the edge map and a scanning window moved thereon in accordance with an embodiment of the invention;

FIG. 5C depicts detection rates and false detection rates of various approaches having different detection criteria.

DETAILED DESCRIPTION

Figure 1:
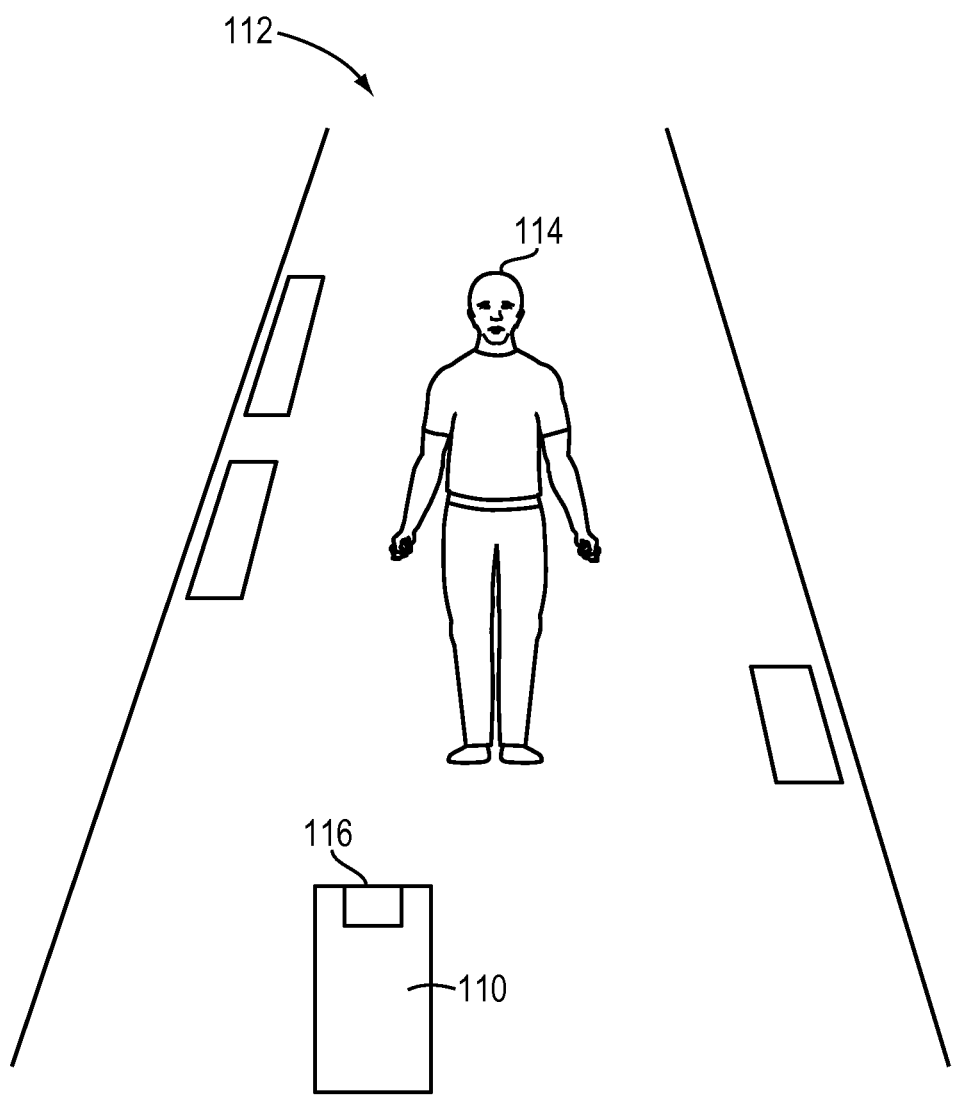
FIG. 1 schematically illustrates an exemplary roadway scene.
Figure 2:
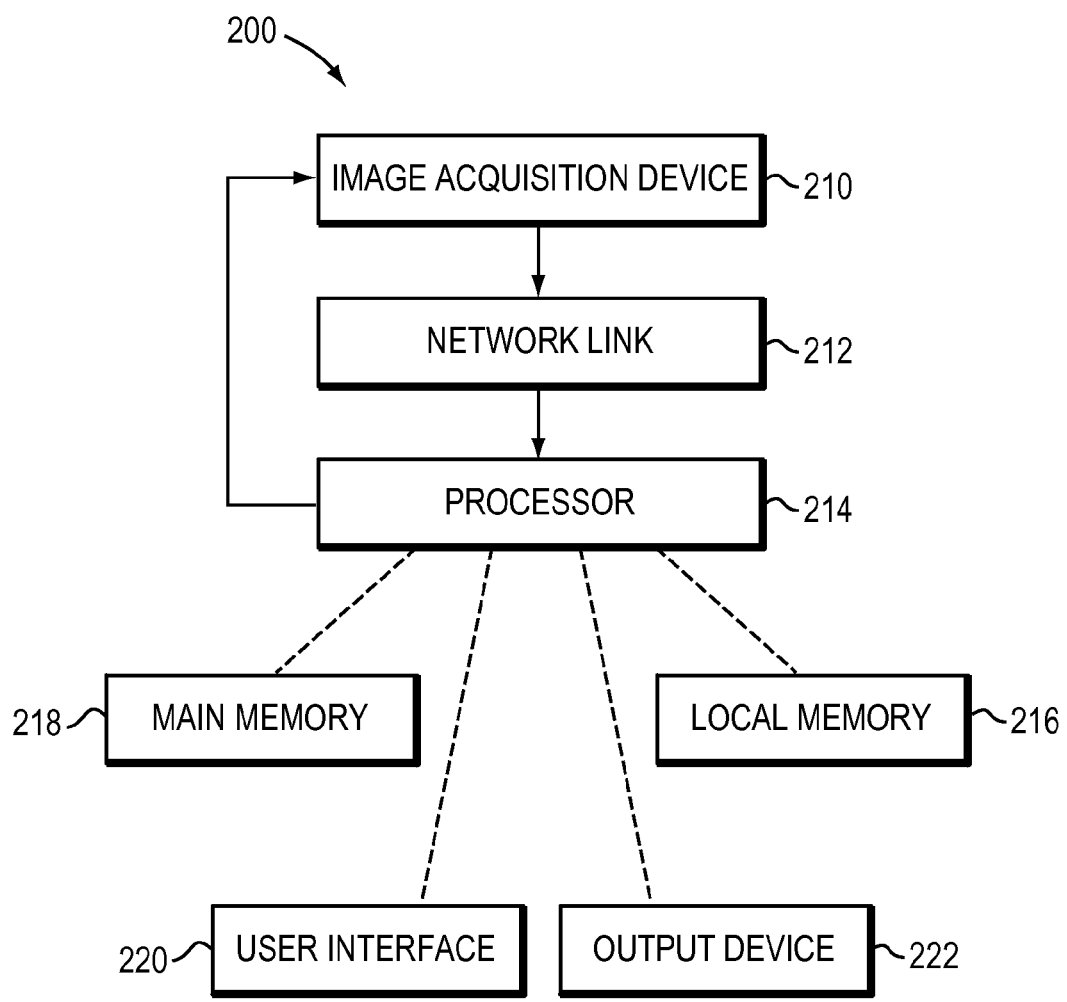
FIG. 2 depicts a system for detecting pedestrians in an image in accordance with an embodiment of the invention.

FIG. 1 illustrates a vehicle 110 traveling on a roadway 112 where a pedestrian 114 is crossing the road. An image-acquisition device 116, for example, a digital camera is mounted on the vehicle 110 such that the pedestrian 114 is located in the viewing area of the image device 116. FIG. 2 illustrates one embodiment of a pedestrian-detection system 200 for detecting pedestrians in a roadway image such as that shown in FIG. 1. An image-acquisition device 210 passes a captured image, via a network link 212, to a main processor 214; the image may be sent automatically by the device 210 (at, e.g., periodic intervals) or in response to a command from the processor 214. The network link 212 may be a bus connection, Ethernet, USB, or any other type of wired or wireless network link. The image-acquisition device 210 may be one or more still-image cameras, video cameras, or any other device or devices capable of capturing an image. The received image may be stored in a local memory 216 and/or a main memory 218 as a series of pixel values and fetched to the processor 214. As explained in greater detail below, the processor 214 then identifies pedestrians and communicates with a vehicle driver via a user interface 220 (e.g., a WiFi link) and/or an output device 222, such as an alarm.

The local memory 216 may be physically located outside or within the main processor 214, e.g., within a partition of main nonvolatile memory or a processor cache. The main processor 214 may be implemented as part of a computer, a mobile device, a navigation system, or any other type of computing system. The user interface 220 may output and display results to a user and/or receive requests, such as commands and/or parameters from the user. The output device 222 may provide an audio or visual alert to the user when, for example, the pedestrian is too close to the vehicle.

In one embodiment, the processor 214 connects to the steering system of the vehicle. When the vehicle is too close to the detected pedestrian, the processor 214 causes the steering system to forcibly steer the vehicle away from the pedestrian. If the automatic driving system is enabled, the steering system maintains the vehicle's position far from the detected pedestrian. Automotive systems configured to execute routines ranging from driver warning to automatic operation in response to detected hazards are well-known in the art.

Figure 3A:
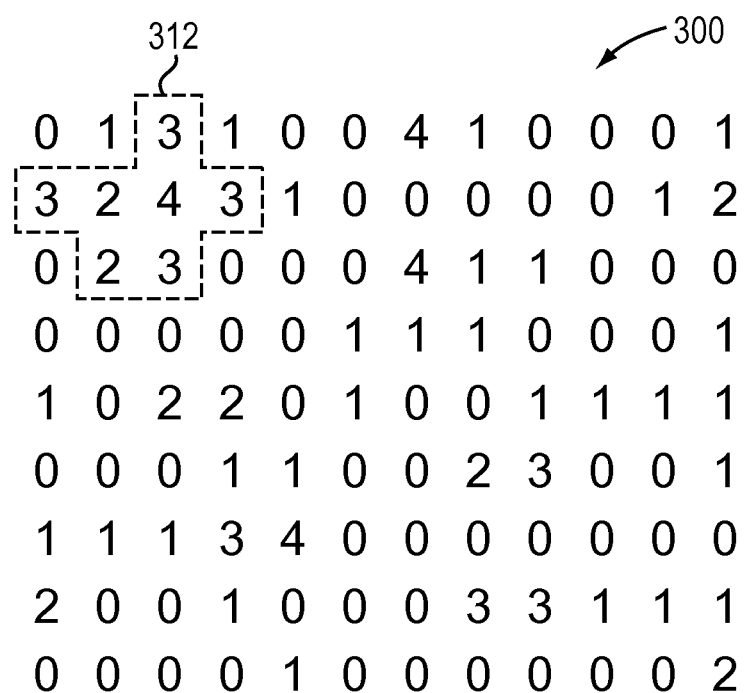
FIG. 3A is an edge map converted from an acquired image.

With reference to FIG. 3A, in various embodiments, upon receiving an image including the pedestrian, a pedestrian detector scans the received image. An edge map (such as the representative example indicated at 300) that identifies pictorially meaningful discontinuities in grayscale levels corresponding to, for example, a boundary between two different regions in the image is generated using a conventional operator, such as a Roberts, Prewitt, or Sobel operator. The illustrated edge map 300 has higher values at points 312, which correspond to the locations where the pedestrian stands. For example, the roadway surface may be darker-colored asphalt or concrete, and the pedestrian may have lighter-colored clothing; the lighter colors of the pedestrian produce greater values in the edge map 300.

Figure 3B:
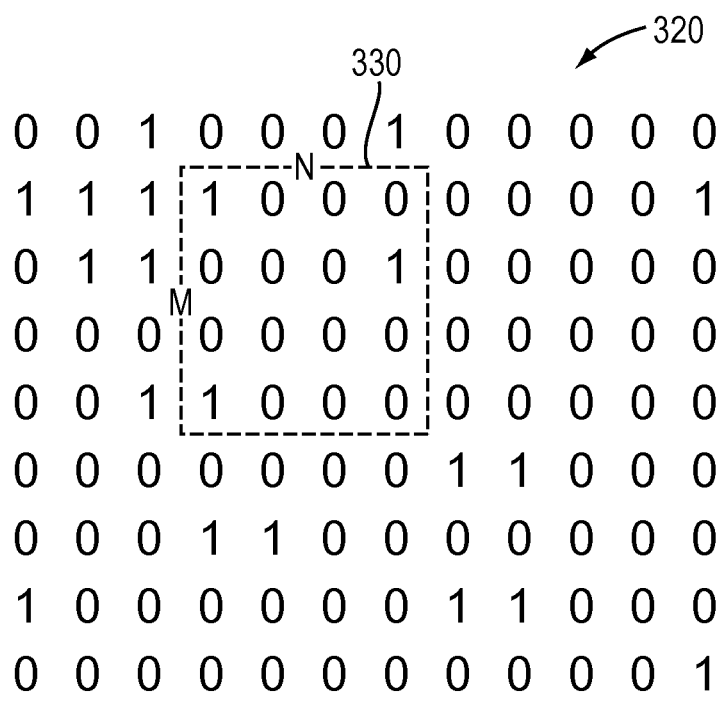

Referring to FIG. 3B, in some embodiments, the edge map is converted to a binary image map 320 by applying a threshold, $TH_0$, thereto. Edge pixels having values equal to or greater than the threshold are marked as "1," while edge pixels having values below the threshold are labeled as "0." For example, the threshold is set as 2; edge pixels having values equal to or larger than 2 in FIG. 3A are marked as "1" in FIG. 3B and edge pixels having values less than 2 are marked as "0." It should, however, be understood that the assigned binary pixel values are not limited to "0" and "1"; any numbers that represent edge pixel values above and below the threshold, respectively, are within the scope of the current invention. The threshold, $TH_0$, may be predetermined (e.g., a fixed value) or calculated for a particular image. For example, the threshold may be determined based on the current image and/or images that were previously taken within a selected time frame. In addition, the threshold may be adaptively adjusted to reflect the quality and brightness of the acquired image. For example, the threshold may be set at a low value when an image is taken under dim moonlight or at a high value when the image is taken under bright sunlight (or is otherwise overexposed). Too low a threshold, however, can result in false positives, while an excessively high threshold may result in failure to detect pedestrians in the image. The present invention is not limited to any particular value (or number) of the thresholds, however, nor must the thresholds be precisely chosen for the invention to operate usefully; any thresholds suitable for a given image are within the scope of the present invention.

A scanning window 330 that typically has a size smaller than that of the binary image map 320 may be defined and applied thereto. The binary pixel values in the scanning window 330 may be analyzed and utilized to determine the likelihood that a pedestrian is present in the image. The scanning window 330 may be moved throughout the entire binary image map 320 or only a portion (e.g., a region of interest, ROI) thereof; by "moving" the scanning window 330 is meant that different regions of the image corresponding in size to the window (and which may or may not overlap) are separately and sequentially analyzed, so the effect is as if the window has been translated over the entirety or a portion of the image.

The scanning window 330 may include N×M binary pixels, where N and M are the number of pixels in the horizontal and vertical directions, respectively; N and M may be the same or different, and in general 0<N<image length and 0<M<image height. The dimensions of the scanning window may be adjusted based on the size of the object or pedestrian. In one embodiment, the scanning window 330 moves less than N pixels horizontally and/or M pixels vertically each time such that the scanning windows 330 overlap during the analysis; detection of pedestrians in multiple overlapped scanning windows indicates a higher likelihood that the image of a pedestrian is, in fact, located in the overlap region. In another embodiment, the scanning window 330 moves a distance larger than N pixels horizontally and/or M pixels vertically—i.e., so that there is no pixel overlap between sequentially analyzed areas of the image—to reduce the number of scanning windows that are analyzed, thereby reducing the processing time.

Figure 4A:
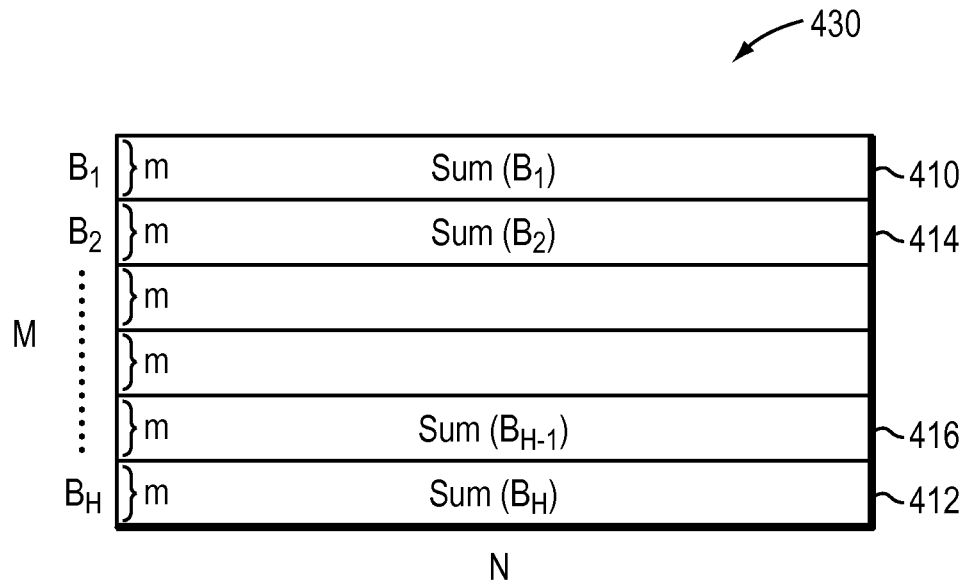
FIGS. 4A and 4B illustrate dividing the binary image map into multiple bins within the scanning window horizontally and vertically, respectively, in accordance with an embodiment of the invention.
Figure 4B:
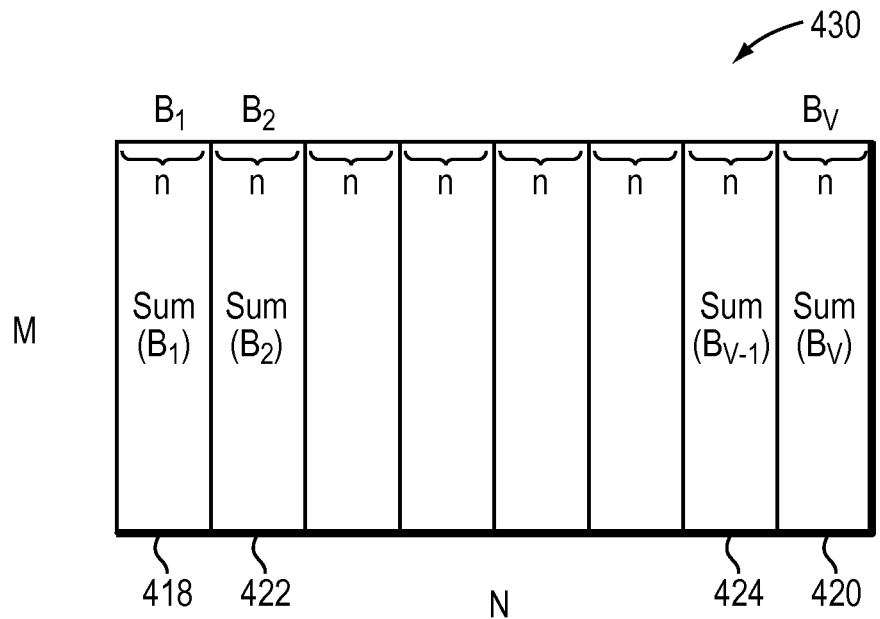

Referring to FIGS. 4A and 4B, in various embodiments, the scanning window 330 is divided into $B_h$ horizontal bins or $B_v$ vertical bins that satisfy equations:

$$B_h = \frac{M}{m}, B_v = \frac{N}{n}$$

where n and m are the horizontal and vertical numbers of binary pixels, respectively, in each bin; each horizontal bin includes N×m binary pixels and each vertical bin includes n×M binary pixels. Each bin may or may not overlap with other bins. Binary pixel values in each bin are then summed together (e.g., Sum ($B_1$), Sum ($B_h$), or Sum ($B_v$)). Two bins having either horizontally or vertically symmetric locations in the scanning window 430—i.e., located horizontally or vertically equidistant from the center of the scanning window 430—are paired up. For example, bins 410 and 412, 414 and 416, 418 and 420, and 422 and 424 each represent a pair of bins having either horizontally or vertically symmetric locations. The summed binary pixel values in each pair of bins are analyzed to identify the pedestrian location. If the summed binary pixel values of both bins in a pair (e.g., pair 418 and 420, or 422 and 424) are above a threshold, $TH_1$, there is a likelihood (whose level is set by the threshold) of pedestrian existence in these bins. This condition may be expressed as:

$Sum(B_1) > TH_1$ and $Sum(B_r) > TH_1$ or $Sum(B_2) > TH_1$ and $Sum(B_{v-1}) > TH_1$ The threshold $TH_1$ for each pair of bins may be different. A larger number of bin pairs having binary pixel values above the threshold indicates there is a higher likelihood of having a pedestrian located in these bins. In one embodiment, $B_h$ and $B_v$ are even numbers such that every binary pixel in the scanning window is analyzed. The threshold $TH_1$ may be a fixed value or a variable that is dynamically calculated based on the acquired image. If the binary image in the scanning window has very few pixel values above the threshold $TH_0$, the threshold $TH_1$ may be set too low and thereby give false detections. To avoid this situation, $TH_1$ may be defined by: $TH_1 = \text{Max}(TH_a, TH_b)$, where $TH_a$ is a function of the number of pixels having values above the threshold $TH_0$ (e.g., $$TH_a = \frac{1}{v} \sum_{i=0}^{N} \sum_{j=0}^{M} b(i,j);$$

b(i,j) is the binary image of the scanning window); $TH_b$ represents a percentage, P, of the number of pixels in each bin $$\left(\text{e.g., } TH_b = p \frac{N \times M}{v}\right);$$

and the Max function returns the larger value of $TH_a$ or $TH_b$. If there are sufficient pixel values above the threshold $TH_0$, $TH_a > TH_b$ and therefore $TH_1 = TH_a$. If, however, the number of pixel values above the threshold $TH_0$ is low, $TH_b > TH_a$, therefore $TH_1 = TH_b$. This approach avoids false detection when the binary image is dark or $TH_0$ is set too high.

Figure 5A:
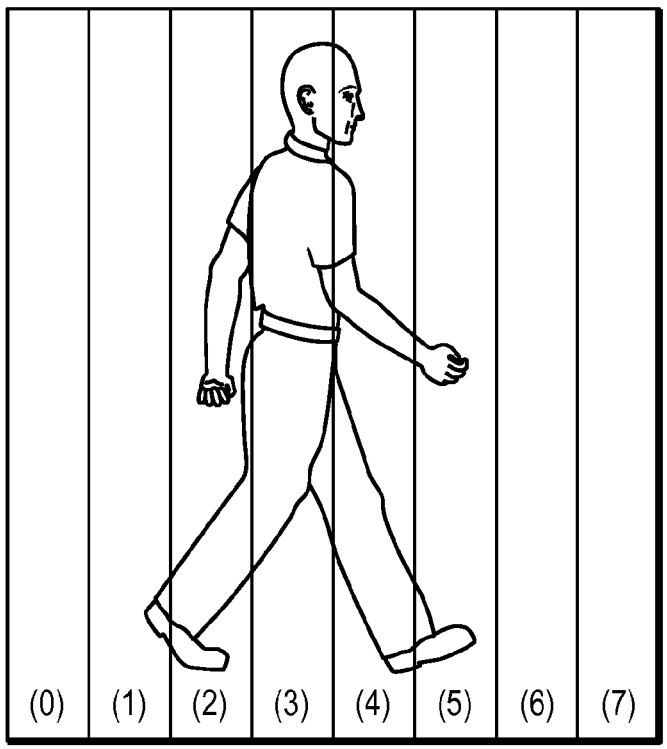
FIG. 5A depicts an exemplary image containing a pedestrian.

FIG. 5A depicts an exemplary image in which a pedestrian can be detected using the approach described above. The scanning window is divided into 8 vertical bins. Because bin(3) and bin(4) each have sufficient numbers of pixels with values above the threshold $TH_0$, the summed binary pixel values for both bins are greater than the threshold $TH_1$; the pedestrian can thereby be localized. To accommodate various sizes of pedestrians in the acquired image, the size of the scanning window may be modified.

Figure 5B:
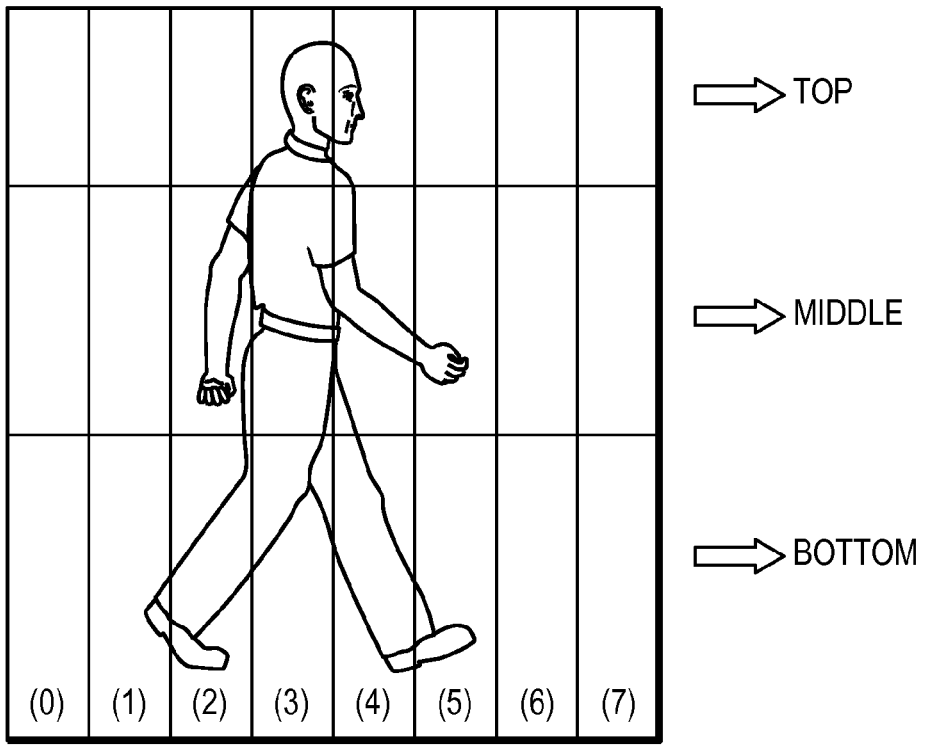
FIG. 5B depicts a scanning window divided into multiple horizontal portions in accordance with an embodiment of the invention.

If the height of the pedestrian is shorter than that of a standing adult (e.g., the pedestrian is a child, sitting in a wheelchair, or in a bending position), the threshold $TH_1$ may be reduced appropriately. To avoid false detections resulting from reducing the threshold $TH_1$ the scanning window can be further divided into multiple horizontal portions, as depicted in FIG. 5B. The same approach as described above can then be applied to each horizontal portion individually. For example, the scanning window may be divided into three horizontal strips (corresponding to the head, body, and legs); the vertical symmetry of these three parts are then checked individually. A pedestrian is considered as being located in the window only if any two of the three portions pass the vertical symmetry check as described above (i.e., having a large number of bin pairs with binary pixel values above the threshold $TH_1$). This criterion gives a satisfactory detection with a 95% detection rate and a 41% false detection rate, as shown in FIG. 5C.

In another embodiment, the summed binary pixel values of two bins in a pair are further summed together and compared with a threshold $TH_2$. If the summed value is above $TH_2$, a pedestrian is considered likely to be located within this pair of bins. Binary pixel values for every pair of bins in the scanning window are summed and compared to the threshold, $TH_2$. This condition may be expressed as:

$$\text{Sum}(B_1) + \text{Sum}(B_v) > TH_2 \text{ or}$$

$$\text{Sum}(B_2) + \text{Sum}(B_{v-1}) > TH_2$$

Again, a larger number of pairs having a summed pixel value above the threshold $TH_2$ indicates a higher likelihood of a pedestrian being located in these bins. In some embodiments, if the summed binary pixel values in the pair of bins are substantially similar—e.g., Sum $(B_1)$ Sum $(B_v)$ or Sum $(B_2)$ ≈Sum $(B_{v-1})$—there is an increased likelihood of pedestrian presence in this pair. A larger number of pairs containing summed binary pixel values similar to one another indicates a higher likelihood of having a pedestrian located in the scanning window. The location of the pedestrian can thus be quickly identified in real-time, occurring as soon as one image or an ROI is scanned and the binary map thereof is analyzed as described above. Embodiments of the current invention, therefore, may be implemented in a low-cost system. Again, the thresholds $TH_1$ and $TH_2$ may be predetermined or calculated based on the binary pixel values in the scanning window 430.

The utility of the approach described above is not limited to detecting pedestrians in an image; rather, it may be employed to identify any objects having a symmetry in any direction in an image. For example, if an object has a diagonal symmetry across the image, an image rotation may be performed prior to dividing the binary image map into multiple bins such that the object has a horizontal or vertical symmetry. The detection approach described above may then be applied to the rotated binary image map to locate the objects. Additionally, the acquired image is not limited to the front-view images; a rear-view image, for example, may be processed to locate a pedestrian for parking assistance.

In some embodiments, the pedestrian-detection approach is combined with other detection approaches to improve accuracy or the level of detected detail. For example, if the number of bin pairs that have a likelihood of pedestrian presence in a scanning window is larger than a threshold number, the window (i.e., the pixel values within the window) is passed to other detection approaches requiring intensive computations to exactly locate the position of the pedestrian. If, on the other hand, the number of bin pairs having a likelihood of pedestrian presence in the scanning window is smaller than the threshold number, the window may be discarded. This approach thus provides a first pass for reducing the number of detection windows prior to applying other pedestrian-detection approaches, thereby quickly obtaining more detailed and accurate pedestrian locations.

Figure 6:
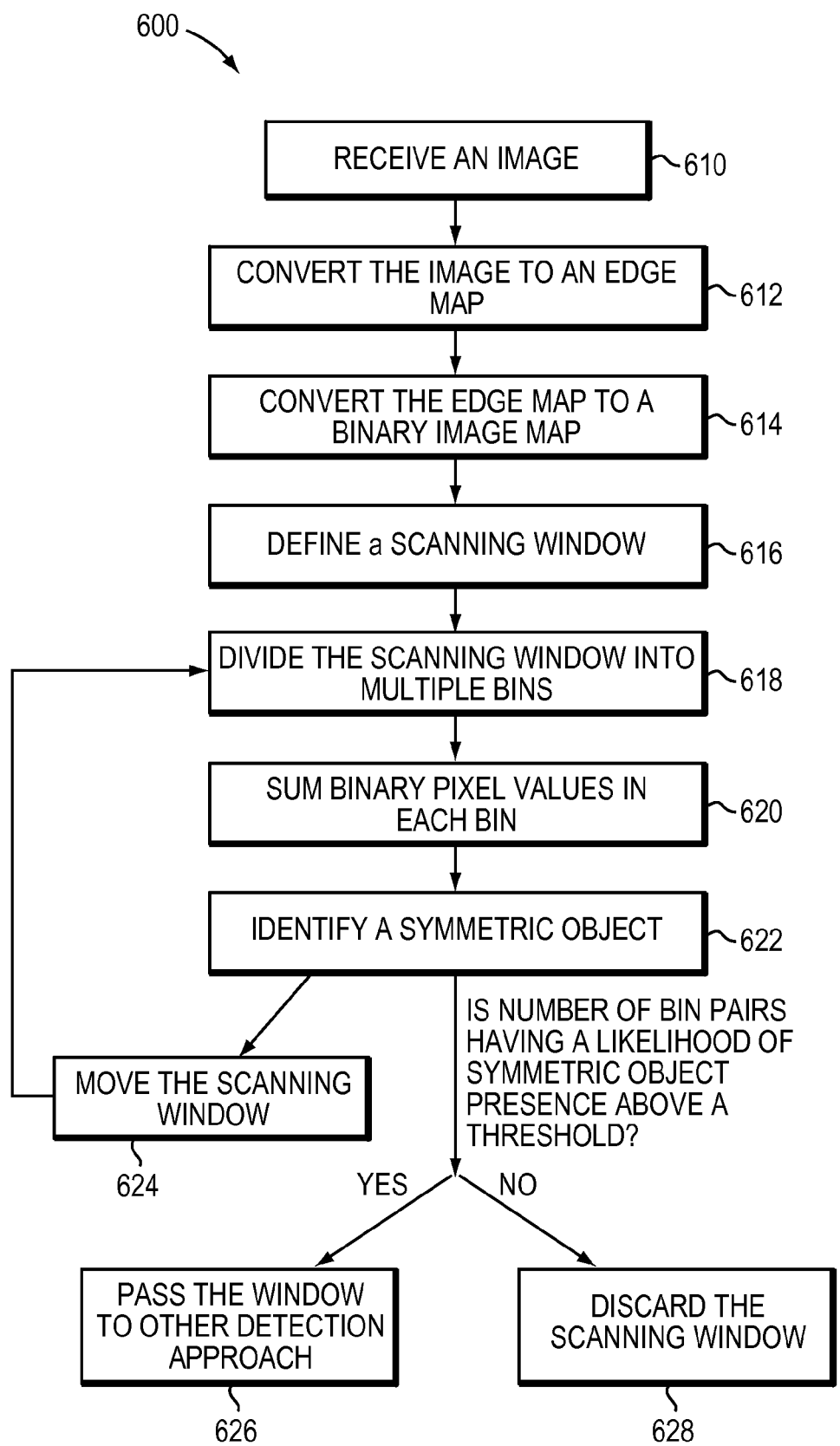
FIG. 6 is a flowchart depicting a method for detecting pedestrians in an image in accordance with an embodiment of the invention.

A representative method 500 for detecting pedestrians or any symmetric object in accordance with embodiments of the current invention is shown in FIG. 6. In a first step 610, an image containing the pedestrian is received. In a second step 612, the acquired image is converted to an edge map. In a third step 614, the converted edge map is converted to a binary image map. A scanning window in the binary map is then assigned (step 616) and divided into multiple bins based on the symmetry direction of the object (step 618). Binary pixel values in each bin are summed (step 620). In step 622, the symmetric object is identified based on the summation of binary pixel values in the bins. In step 624, the scanning window is moved to another location within the binary image map or ROI. Steps 618-622 are repeated until the entire binary image map or ROI is analyzed. In some embodiments, if the number of bin pairs in a scanning window that have a likelihood of containing the searched-for object exceeds a threshold number, this window is passed to other detection approaches to obtain detailed location information about the object (step 626). If, on the other hand, the number of bin pairs is below the threshold number, the scanning window is discarded (step 628).

Alternatively or in addition to passing the window to another image-processing application, the result of step 626 may be used to drive a control application or apparatus, e.g., an alert system in an automobile. For example, if the likelihood that the vehicle is approaching a pedestrian exceeds a first threshold, the driver may be alerted by an visual or audible signal, while a higher likelihood may trigger a collision-avoidance system implemented in the vehicle.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A computer-implemented method for identifying a symmetric object in an image represented as an edge map, the method comprising steps, performed by a processor, of:
   (a) converting the edge map into a binary image map comprising binary pixel values;
   (b) dividing the binary image map within a scanning window into a plurality of bins;
   (c) summing binary pixel values in at least some of the bins; and
   (d) identifying the symmetric object based at least in part on comparing the summed binary pixel values of one or more bins with at least one threshold value.

2. The method of claim 1, wherein converting the edge map into a binary image map comprises comparing each pixel value in the edge map with a predetermined conversion threshold value.

3. The method of claim 2, wherein the predetermined conversion threshold value is determined based at least in part on pixel values in the edge map.

4. The method of claim 1, wherein the at least one threshold value is predetermined.

5. The method of claim 1, wherein the at least one threshold value is dynamically calculated based on the image.

6. The method of claim 5, wherein the at least one threshold value satisfies the equation:

$$TH_1 = \text{Max}(TH_a, TH_b),$$

where $TH_a$ is a function of a number of pixels having values above a second threshold, $TH_b$ represents a percentage of a number of pixels in each bin, and Max is a function that returns the larger of $TH_a$ or $TH_b$.

7. The method of claim 1, further comprising comparing the summed binary pixel values of two horizontal or vertical bins having locations that are symmetric in the scanning window.

8. The method of claim 1, further comprising summing the summed binary pixel values of two horizontal or vertical bins having locations that are symmetric in the scanning window.

9. The method of claim 8, wherein identifying the symmetric object comprises comparing the summed binary pixel values of the two bins with a predetermined threshold value.

10. The method of claim 1, wherein the plurality of bins are non-overlapping.

11. The method of claim 1, wherein the plurality of bins contain an identical number of binary pixels.

12. The method of 11, wherein numbers of the horizontal and vertical bins satisfy equations:

$$B_h = \frac{M}{m}, B_v = \frac{N}{n}$$

where $B_h$ and $B_v$ denote the number of horizontal and vertical bins, respectively, within the scanning window; N and M are horizontal and vertical numbers of binary pixels, respectively, of the scanning window; and n and m are the horizontal and vertical numbers of binary pixels, respectively, in each bin.

13. The method of claim 1, further comprising moving the scanning window to a different location within the binary image map and repeating steps (c) and (d) in each location.

14. The method of claim 1, further comprising dividing each bin into a plurality of sub-bins, the symmetric object being determined based at least in part on the summed binary pixel values in the sub-bins.

15. The method of claim 1, wherein dimensions of the scanning window are determined based on a size of the object.

16. A system for identifying a symmetrical object in an image, the system comprising:
   computer memory for storing an edge map of the image; and
   a computer processor configured to:
      (a) convert the edge map into a binary image map comprising binary pixel values;
      (b) divide the binary image map within a scanning window into a plurality of bins;
      (c) sum binary pixel values in at least some of the bins; and
      (d) identify the symmetrical object based at least in part on comparing the summed binary pixel values of one or more bins with at least one threshold value.

17. The system of claim 16, wherein the binary image map is stored in the computer memory.

18. The system of claim 16, wherein the processor is further configured to compute a sum of the summed binary pixel values of two horizontal or vertical bins having locations that are symmetric in the scanning window.

19. The system of claim 16, wherein the processor is a digital-signal processor.

20. The method of claim 1, wherein the step (c) comprises summing binary pixel values in each bin and the step (d) comprises identifying the symmetric object based at least in part on comparing the summed binary pixel values obtained in step (c) with a threshold value.

21. The system of claim 16, wherein step (c) comprises summing binary pixel values in each bin and step (d) comprises identifying the symmetric object based at least in part on comparing the summed binary pixel values obtained in step (c) with a threshold value.

22. Non-transitory computer readable storage medium storing one or more computer readable instructions which, when executed on a processor, configure the processor to carry out a method for identifying a symmetric object in an image represented as an edge map, the method comprising steps of:
   (a) converting the edge map into a binary image map comprising binary pixel values;
   (b) dividing the binary image map within a scanning window into a plurality of bins;
   (c) summing binary pixel values in at least some of the bins; and
   (d) identifying the symmetric object based at least in part on comparing the summed binary pixel values of one or more bins with at least one threshold value.

23. The non-transitory computer readable storage medium of claim 22, wherein the step (c) comprises summing binary pixel values in each bin and the step (d) comprises identifying the symmetric object based at least in part on comparing the summed binary pixel values obtained in step (c) with a threshold value.

24. The non-transitory computer readable storage medium of claim 22, wherein the method further comprises comparing the summed binary pixel values of two horizontal or vertical bins having locations that are symmetric in the scanning window.

25. The non-transitory computer readable storage medium of claim 22, wherein the method further comprises summing the summed binary pixel values of two horizontal or vertical bins having locations that are symmetric in the scanning window, wherein identifying the symmetric object comprises comparing the summed binary pixel values of the two bins with a predetermined threshold value.

26. A system for identifying a symmetrical object in an image, the system comprising:

means to store an edge map of the image; and
means to
- (a) convert the edge map into a binary image map comprising binary pixel values;
- (b) divide the binary image map within a scanning window into a plurality of bins;
- (c) sum binary pixel values in at least some of the bins; and
- (d) identify the symmetric object based at least in part on comparing the summed binary pixel values of one or more bins with at least one threshold value.

27. The system of claim 26, wherein step (c) comprises summing binary pixel values in each bin and step (d) comprises identifying the symmetric object based at least in part on comparing the summed binary pixel values obtained in step (c) with a threshold value.

28. The system of claim 26, further comprising means to compare the summed binary pixel values of two horizontal or vertical bins having locations that are symmetric in the scanning window.

29. The system of claim 26, further comprising means to sum the summed binary pixel values of two horizontal or vertical bins having locations that are symmetric in the scanning window, wherein identifying the symmetric object comprises comparing the summed binary pixel values of the two bins with a predetermined threshold value.

* * * * *